(12) United States Patent
Tailliet et al.

(10) Patent No.: US 9,544,025 B2
(45) Date of Patent: Jan. 10, 2017

(54) ELECTRONIC DEVICE WITH A RADIOFREQUENCY FUNCTION

(71) Applicant: STMicroelectronics (Rousset) SAS, Rousset (FR)

(72) Inventors: François Tailliet, Fuveau (FR); Marc Battista, Marseilles (FR)

(73) Assignee: STMicroelectronics (Rousset) SAS, Rousset (FR)

(*) Notice: Subject to any disclaimer, the term of this patent is extended or adjusted under 35 U.S.C. 154(b) by 0 days.

(21) Appl. No.: 14/849,385

(22) Filed: Sep. 9, 2015

(65) Prior Publication Data

US 2016/0173171 A1 Jun. 16, 2016

(30) Foreign Application Priority Data

Dec. 12, 2014 (FR) ..................... 14 62307

(51) Int. Cl.
*H04B 5/00* (2006.01)
*G06K 19/077* (2006.01)
*H02H 9/04* (2006.01)

(52) U.S. Cl.
CPC ....... *H04B 5/0037* (2013.01); *G06K 19/07769* (2013.01); *H02H 9/044* (2013.01)

(58) Field of Classification Search
CPC .................................................. H04L 25/0278
See application file for complete search history.

(56) References Cited

U.S. PATENT DOCUMENTS

| 6,003,777 | A | 12/1999 | Kowalski | |
|---|---|---|---|---|
| 2004/0198262 | A1* | 10/2004 | Ehrenreich | H03G 3/3036 455/115.1 |
| 2011/0261004 | A1* | 10/2011 | Chen | H03K 17/9645 345/174 |

FOREIGN PATENT DOCUMENTS

WO 99/21119 A1 4/1999

* cited by examiner

*Primary Examiner* — Tuan H Nguyen
(74) *Attorney, Agent, or Firm* — Seed IP Law Group LLP

(57) ABSTRACT

An electronic device includes at least one processing circuit connected through at least one terminal at a first reference voltage. At least one radio frequency communication circuit is connected at least to receive the reference voltage. At least one first pad is intended to be taken to a second reference voltage of at least one electronic circuit external to the device. At least one first resistive impedance is coupled between the terminal and the first pad.

20 Claims, 4 Drawing Sheets

ELECTRONIC DEVICE WITH A RADIOFREQUENCY FUNCTION

BACKGROUND

Technical Field

The present disclosure generally relates to electronic circuits and systems and, more particularly, to electronic circuits or devices capable of operating both in radio frequency communication and by contact.

Description of the Related Art

More and more, electronic circuits or devices are capable of communicating with other circuits or systems, be it in hard-wired fashion by an electric contact connection, or wireless by radio frequency link. This for example concerns electronic tags having not only a radio frequency communication antenna, but also electric contact terminals, "dual mode" devices which are capable of operating either in contact mode or in contactless mode, such as, for example, near field communications (NFC) interface devices. These may also be contactless communication circuits having standardized I2C or SPI-type hard-wired accesses.

In this type of devices, the sensitivity to electromagnetic disturbances is increased by the presence of the wire contacts which form parasitic antennas.

BRIEF SUMMARY

An embodiment aims at overcoming all or part of the disadvantages of electronic circuits and devices having radio frequency and hard-wired communication interfaces.

An embodiment more specifically aims at a solution adapted to "dual mode"-type radio frequency circuits.

Another embodiment aims at a solution compatible with different types of hard-wired interfaces. Thus, an embodiment provides an electronic device comprising:

at least one processing circuit connected to at least one terminal at a first reference voltage;

at least one radio frequency communication circuit connected at least to said reference voltage terminal;

at least one first pad intended to be taken to a second reference voltage of at least one electronic circuit external to the device; and at least one first resistive impedance between said terminal and said first pad.

According to an embodiment said first impedance has a resistance greater than one kilo-ohm.

According to an embodiment, the device comprises a first switch across said resistive impedance.

According to an embodiment, said first switch is off in an operating mode where the radio frequency circuit is used.

According to an embodiment, each pad of connection to an element external to the device is associated with a circuit of protection against electrostatic discharges.

According to an embodiment, the protection circuit comprises a diode-connected transistor formed in a well insulated from said terminal.

According to an embodiment, said protection circuits are directly connected to the first pad.

According to an embodiment, said processing circuit is connected, via a second resistive impedance, to a second pad of application of a power supply voltage.

According to an embodiment, the device comprises a second switch across said second resistive impedance.

The foregoing and other features and advantages will be discussed in detail in the following non-limiting description of specific embodiments in connection with the accompanying drawings.

DETAILED DESCRIPTION

Figure 1:
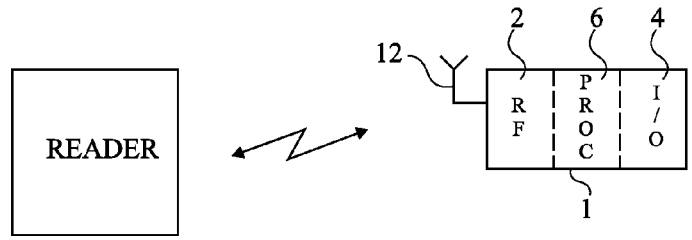
FIG. 1 very schematically shows an example of a contactless transmission system of the type to which the embodiments which will be described apply.

The same elements have been designated with the same reference numerals in the different drawings. For clarity, only those elements which are useful to the understanding of the described embodiments have been shown and are detailed. In particular, the operation of the circuits for wired or wireless transmissions and the internal structures of the devices have not been detailed, the described embodiments being compatible with the usual operation and structures.

Unless otherwise specified, expressions "approximately", "substantially", and "in the order of" mean to within 10%, preferably to within 5%.

FIG. 1 very schematically shows an example of a contactless transmission system of the type to which the embodiments which will be described apply.

A reader (READER) is capable of being in contactless communication with a device 1. Device 1 is not only equipped with an antenna connected to radio frequency circuits 2 (RF) or radio frequency head, but is also provided with contact input/output circuits 4 (I/O). The exchanges with or without contact are processed by one or a plurality of circuits 6 (PROC), generally digital, specific to device 1 and which depend on its application. Input-output circuits 4 are intended to be connected to other functions (not shown) external to device 1, for example, circuits that need to use the radio frequency communication function.

Figure 2:
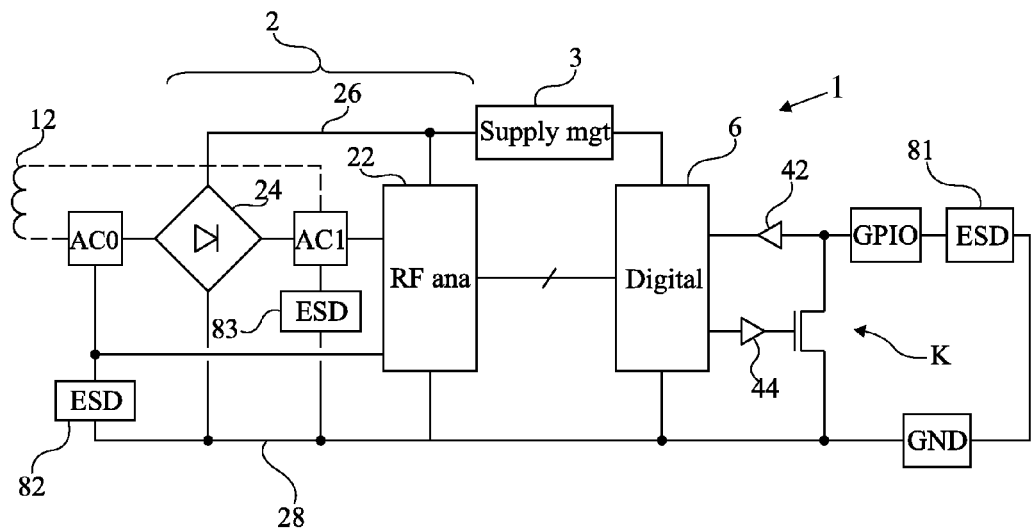
FIG. 2 is a block diagram of an example of a usual electronic tag provided with radio frequency and contact communication interfaces.

FIG. 2 is a block diagram of an example of a known device 1, in the form of an electronic tag provided with radio frequency and contact communication interfaces.

Radio frequency portion 2 comprises analog circuits (block 22, RF ana) for processing and converting communications between antenna 12 and digital processing circuits 6 (Digital). Radio frequency input-output terminals of block 22 are connected to connection pads AC0 and AC1 of antenna 12. Pads AC0 and AC1 are also connected to analog inputs of a rectifying bridge 24, intended to extract from the sensed radio frequency field the power required for the circuit operation. The rectified output terminals of bridge 24 define positive and reference (ground) terminals 26 and 28 of the analog circuits. A regulation circuit 3 (Supply mgt) is in charge of providing a power supply voltage to circuits 6, the ground being common. On the digital side, two pads GPIO and GND of contact with external functions are respectively connected, by an amplifier 42 (driver), to an input terminal of circuit 6 and to the common ground 28 (generally a ground plane of the circuit integrating the different functions of device 1). In the example of FIG. 2, an open-drain type contact connection is assumed. A switch K (typically a MOS transistor), controlled by circuit 6 via a single amplifier 44, connects pads GPIO and GND, to output a low state.

For protection against electrostatic discharges (touch of an object or of an operator's fingers, particularly on assembly of the device), protection circuits 81, 82, and 83 (ESD) are provided. Typically, these circuits are formed, in their simplest version, of a diode-connected bipolar transistor connecting each pad GPIO, AC0, AC1 to ground 28.

In such a circuit, contact pads GPIO and GND with their connection conductors internal to the device or the lines of connection to the external functions, form a parasitic antenna, of electromagnetic dipole type, capable of introducing electromagnetic disturbances. In particular, if a disturbance is sensed by the ground plane (either directly by pad GND, or due to its shorting with pad GPIO when switch K is on), this translates as a common-mode disturbance on the radio frequency portion side, that is, the voltage of the two pads AC0 and AC1 varies simultaneously. Such disturbances adversely affect the device operation, particularly when it operates in electronic tag mode (TAG).

Similar problems are posed for other types of connections on the digital side, for example, by the positive power supply line in the case where a corresponding pad exists on the digital side, by pads of connection to standardized processing circuits, for example, of I2C or SPI type, etc.

Figure 3:
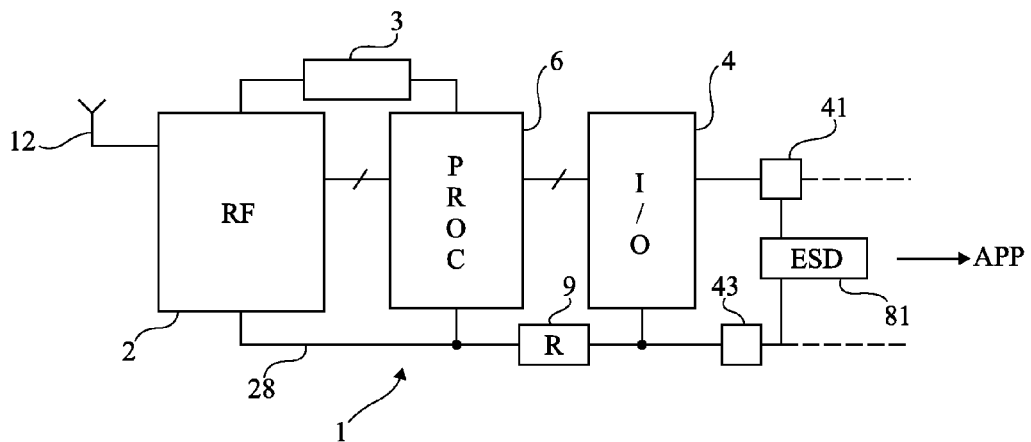
FIG. 3 is a block diagram of an embodiment of a device provided with radio frequency and contact communication interfaces, equipped with an element enabling improvement of the immunity to noise.

FIG. 3 is a block diagram of an embodiment of device 1, provided with radio frequency and contact communication interfaces, equipped with an element enabling to improve the immunity to noise originating from the digital portion and, in particular, from the pads of connection to the digital functions.

It shows one or a plurality of radio frequency circuits (RF) intended to be connected to an antenna 12, one or a plurality of digital circuits 6 (PROC), one or a plurality of input/output circuits 4 (I/O) on the digital side, connected to pads, for example, here, two pads 41 (data) and 43 (for example, ground pads). The number of pads depends on the application and on the communication need between circuits 6 and the other functions or electronic circuits APP, external to device 1. The example of FIG. 3 assumes a device 1 powered with the energy sensed by the antenna and regulated by a circuit 3. However, as will be seen hereafter, what will be described also applies to the case where a positive (or negative) power supply is supplied by block 4 from a connection to another pad.

According to this embodiment, a resistive impedance 9 (R) is interposed between ground pad 43 and ground line 28 common to circuits 2 and 6. Element 9 has a much greater impedance than the parasitic resistors present in the device. Typically, the value of resistor R is at least one kilo-ohm, for example, in the range from 1 to 20 kilo-ohms, preferably a few kilo-ohms.

The function of resistor R is to increase the impedance between pad 43 and internal node 28 of device 1 (more generally between all the pads of connection to other electronic circuits external to the device and the internal nodes of device 1). Thus, the noise introduced by the pads is attenuated and does not disturb radio frequency transmissions and, in particular, introduces no common mode. It can be considered that the reference voltages of node 28 and of pad 43 are then different.

Since ground pad 43 is then insulated from ground plane 28 by resistor R and however connected to circuits of block 4, it needs to be protected against possible electrostatic discharges. Accordingly, protection circuits 81 (ESD) connecting the different pads to pad 43 (and not to ground 28 of device 1) are provided.

Figure 4:
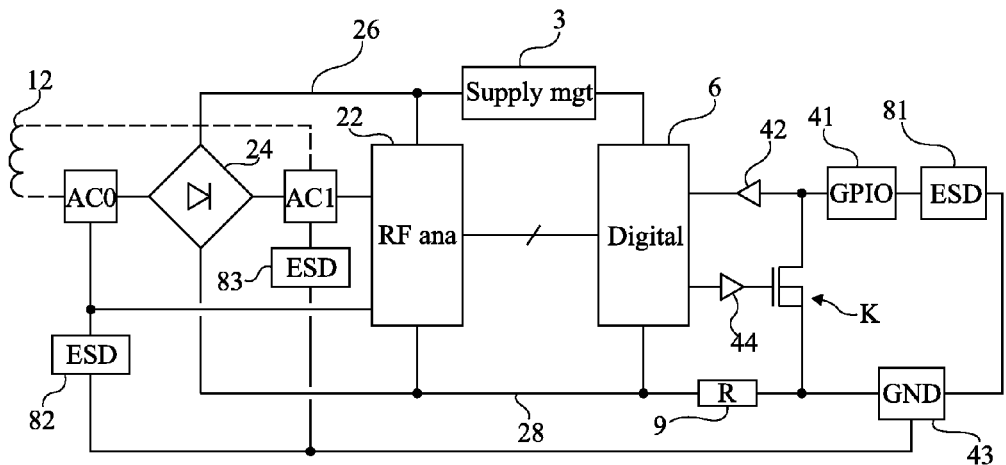
FIG. 4 is a block diagram illustrating an embodiment of a device of the type in FIG. 2, equipped with a noise immunity element.

FIG. 4 is a block diagram illustrating an embodiment of a device of the type in FIG. 2, equipped with a noise immunity element.

As compared with FIG. 2, a resistor 9 (R) is interposed between pad 43 (GND) and ground line 28 of the device.

The bulk of the MOS transistor forming switch K is directly connected to the source of the transistor, and thus to pad GND. It should be noted that the transistor bulk should be insulated from the ground plane of the integrated circuit (and thus from node 28). In practice switch K will be formed in a well insulated from the integrated circuit bulk.

Electrostatic protection circuits 81, 82, and 83 are provided between pads 41, AC0 and AC1 and pad 43 (GND). These circuits are insulated from ground plane 28.

Figure 5:
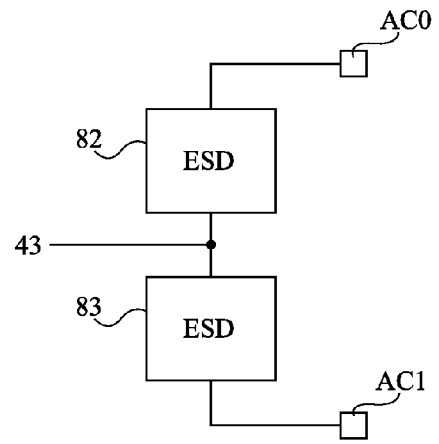
FIG. 5 is an electric diagram illustrating an example of a circuit of protection against electrostatic discharges.

FIG. 5 is an electric diagram illustrating an example of ESD protection circuits 82 and 83.

These circuits are each formed, for example, of a diode-connected bipolar transistor connecting pad AC0, respectively AC1, to the terminal, line, or ground plane 28 of device 1. Such an ESD protection circuit structure is known per se.

Other structures of ESD protection circuits may be used. However, according to the components used, it will be ascertained that the protection circuit is "insulated" from ground plane 28, that is, in practice, that the transistor forming this protection circuit is in a well insulated from the substrate of the integrated circuit supporting the ground plane.

Figure 6:
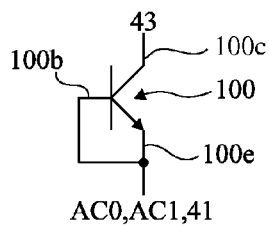
FIG. 6 shows the electric diagram of an embodiment of a protection circuit.

FIG. 6 shows the electric diagram of an embodiment of an ESD protection circuit connecting pad 43 to one of pads 41, AC0 or AC1. In this example, an NPN-type bipolar transistor 100 having its base 100b directly connected to emitter 100e is used.

Figure 7:
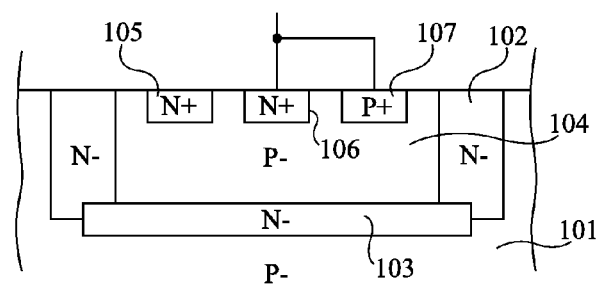
FIG. 7 is a simplified cross-sectional view of an embodiment of the protection circuit of FIG. 6.

FIG. 7 shows an embodiment of such a transistor in a substrate 101 supporting, at its rear surface, the ground plane (not shown) of the integrated circuit. Transistor 100 is formed in a well laterally delimited by insulating trenches 102 (for example, made of N-silicon) and horizontally delimited by a region 103, also of type N-silicon. Substrate 104, here of type P−, of transistor 104 is contained in the well and areas 105, 106 of type N+ and 107 of type P+ define collector 100c, base 100b, and emitter 100e.

Figure 8:
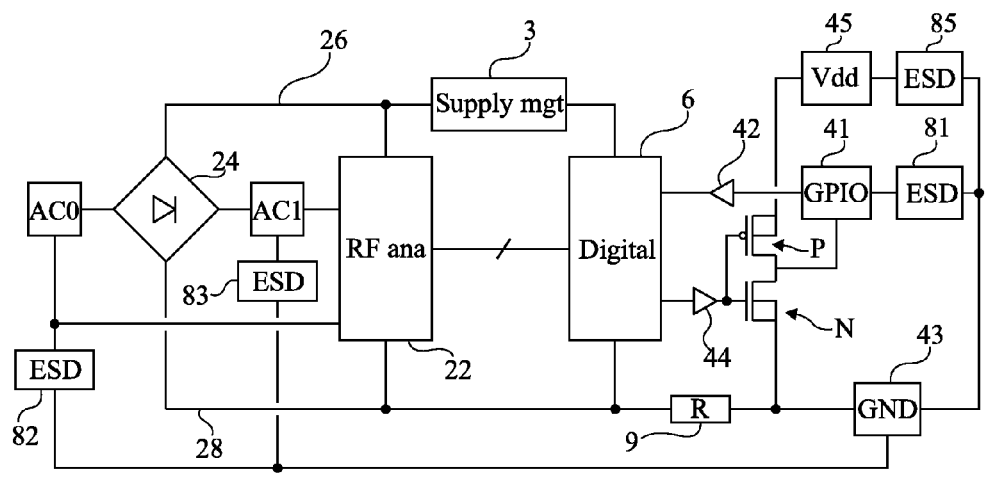
FIG. 8 shows another embodiment of an interface device with and without contact.

FIG. 8 shows another embodiment of a contact or contactless interface device. In FIG. 8, as well as in the following drawings, antenna 12 has not been shown, for simplification.

As compared with the embodiment of FIG. 4, the connection to pad 41 is of CMOS type, that is, the device comprises, in addition to pads 41 (GPIO) and 43 (GND), a pad 45 (Vdd) intended to receive a positive voltage. On the side of the I/O circuits 4, which is on the right of FIG. 8, an amplifier 44 controls a pair of CMOS transistors (P transistor and N transistor series-connected between pads 45 and 43 with pad 41 connected to the midpoint of this series association). An ESD protection circuit 85 connects pad 45 to pad 43.

In the embodiments of FIGS. 4 and 8, impedance 9 may be formed of a single series resistor between pad 43 and ground 28.

Figure 9:
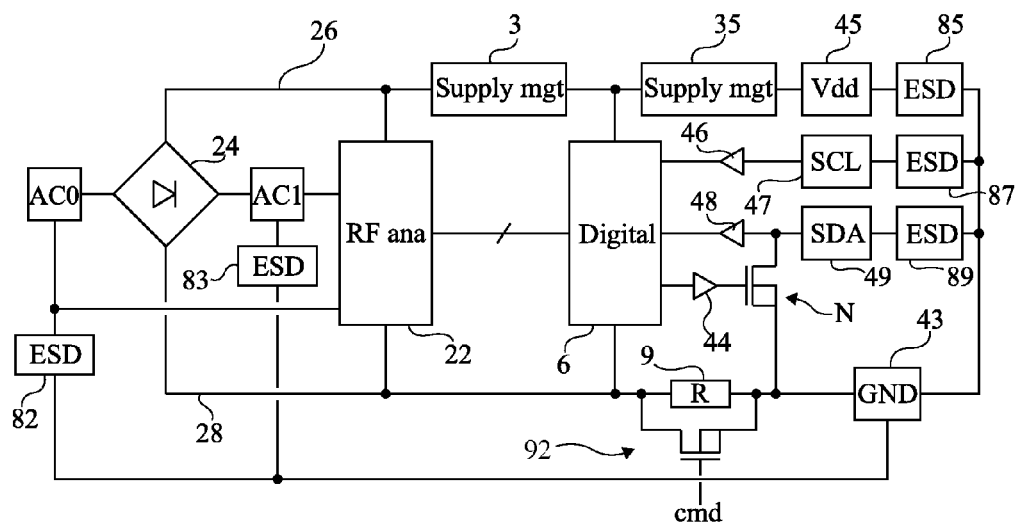
FIGS. 9 and 10 are block diagrams illustrating two other embodiments.
Figure 10:
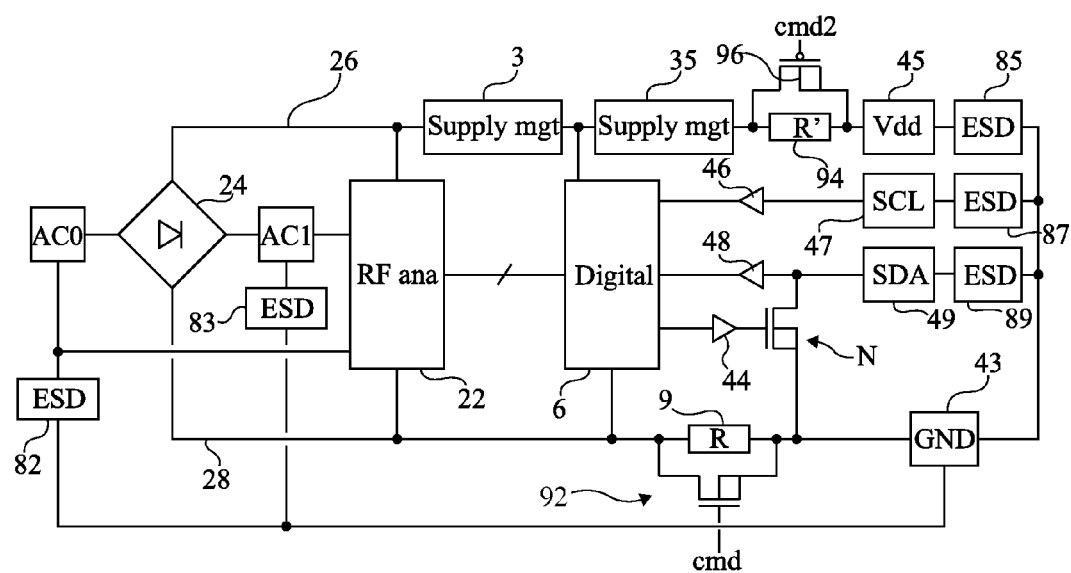

FIGS. 9 and 10 are simplified block diagrams illustrating two other embodiments, applied to devices capable of operating either in radio frequency mode by being self-powered by antenna 12 (by the power sensed by the latter), or in an I2C mode (or more generally any other hard-wired mode of communication with external circuits) by being powered by circuits external to the device. Thus, conversely to the previous embodiments, circuits 6 are powered either by the radio frequency portion (regulation circuit 3), or by a pad 45 (Vdd), an optional regulator 35 being then interposed between pad 45 and the terminal of positive power supply of circuits 6.

In the shown example, applied to an I2C-type communication, respective synchronization and data pads 47 (SCL) and 49 (SDA), specific to standard I2C, are connected by amplifiers 46, respectively 48, to circuits 6. Pad 49 is further connected by an N MOS transistor, to pad 43 in the same way as pad 41 of the embodiment of FIG. 4, data bus SDA of the I2C standard requiring an open-drain operation. Pads 47 and 49 are further connected to pad 43 by ESD protection circuits 87 and 89.

To avoid that in I2C mode, a significant current flows through resistor 9, which generates losses, a switch 92 (for example, a MOS transistor, preferably of type N) shorting resistor 9, that is, directly connecting pad 43 to ground 28, is preferably provided. Switch 92 is controlled by a signal cmd originating from circuits 6 to be on in I2C mode and off in radio frequency mode. Thus, in radio frequency mode, disturbances capable of originating from the circuits connected to pads 43, 45, 47, and 49 and, in I2C mode, a power dissipation in resistor 9, are avoided.

In the example of FIG. 9, the positive power supply line is not protected against possible disturbances. This may be sufficient in certain applications. Indeed, the noise likely to originate from contact connections mainly originates from the ground connection.

In the example of FIG. 10, it is further provided to limit disturbances capable of originating from the positive power supply line. A resistive impedance 94 (R') is thus inserted between pad 45 and regulation circuit 35. Such an impedance, preferably a resistor, plays the same role as resistor R on the ground side by filtering disturbances originating from pad 45. Preferably, a switch 96, for example, a MOS transistor, here of type P, is provided to short resistor R' in wired mode, that is, when the power supply originates from terminal 45. Switch 96 is controlled by a signal cmd2, preferably identical to signal cmd.

An advantage of the described embodiments is that it is now possible to limit the influence of contact connections to electronic circuits on a radio frequency reception.

Another advantage is that the described solutions are compatible with the usual operation of radio frequency devices.

Specific embodiments have been described. Various alterations and modifications will occur to those skilled in the art. In particular, the selection of the value to be given to resistor R or to resistors R and R' depends on the application and on a trade-off between the expected disturbance level and, with no switch for shorting this (these) resistor(s), the losses acceptable in contact mode. Further, although the embodiments have been described in relation with specific examples, they easily transpose to any device designed to share electronic circuits 6 between a radio frequency operating mode and a contact operating mode. Finally, the practical implementation of the embodiments which have been described is within the abilities of those skilled in the art based on the functional indications given hereabove.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

What is claimed is:

1. An electronic device, comprising:
   at least one processing circuit connected to a reference voltage terminal at a first reference voltage;
   at least one radio frequency communication circuit connected at least to said reference voltage terminal;
   at least one first pad intended to be taken to a second reference voltage of at least one electronic circuit external to the electronic device; and
   at least one first resistive impedance between said reference voltage terminal and said first pad.

2. The electronic device of claim 1, wherein said first impedance has a resistance greater than one kilo-ohm.

3. The electronic device of claim 1 further comprising a first switch across said resistive impedance.

4. The electronic device of claim 3, wherein said first switch is configured to be open in an operating mode in which the radio frequency circuit is used.

5. The electronic device of claim 1, wherein each at least one pad provides connection to an element external to the electronic device is associated with a circuit of protection against electrostatic discharges.

6. The electronic device of claim 5, wherein the protection circuit comprises a diode-connected transistor formed in a well insulated from said terminal.

7. The electronic device of claim 5, wherein each of said circuits of protection is directly connected to the first pad.

8. The electronic device of claim 1, wherein said at least one processing circuit is connected, via a second resistive impedance, to a second pad of application of a power supply voltage.

9. The electronic device of claim 8 further comprising a second switch across said second resistive impedance.

10. An electronic device, comprising:
    digital processing circuitry including a first reference voltage node and a first supply voltage node;
    communication circuitry including first and second communications nodes, the communications circuitry coupled to the digital processing circuitry and configured to provide a first reference voltage on the first reference voltage node and to provide a supply voltage on the first supply voltage node;

a plurality of external coupling nodes, the plurality of external coupling nodes including a second reference voltage node configured to be coupled to receive a second reference voltage from external electronic circuitry coupled to the electronic device; and a first resistive impedance coupled between the first and second reference voltage nodes.

11. The electronic device of claim 10 further comprising a first switch coupled in parallel with the first resistive impedance.

12. The electronic device of claim 11, wherein the plurality of external coupling nodes further comprise a second supply voltage node and wherein a second resistive impedance is coupled between the second supply voltage node and the first supply voltage node.

13. The electronic device of claim 12 further comprising a second switch coupled in parallel with the second resistive impedance.

14. The electronic device of claim 13, wherein the digital processing circuitry is coupled to the first and second switches and is configured to control the switches to open the switches responsive to detecting external electronic circuitry is coupled to the electronic device and is configured to close the switches responsive to detecting no external electronic circuitry is coupled to the electronic device.

15. The electronic device of claim 14 further comprising an antenna coupled across the first and second communications nodes.

16. The electronic device of claim 14 further comprising a plurality of electrostatic discharge circuits, respective electrostatic discharge circuits being coupled between the first and second communications pads and the first reference voltage node and between the plurality of external coupling nodes and the second reference voltage node.

17. A method, comprising:
generating electrical signals across a pair of communications nodes responsive to received electromagnetic signals;
generating electrical power across a first reference voltage node and a first supply voltage node responsive to the electrical signals across the pair of communications nodes;
extracting information from the electrical signals across the pair of communications nodes;
receiving electrical signals on a plurality of external coupling nodes, the plurality of external coupling nodes including a second reference voltage node; and
coupling the second reference voltage node to the first reference voltage node through a first resistive element.

18. The method of claim 17, wherein the plurality of external coupling nodes includes a further second supply voltage node, and wherein the method further comprises coupling the second supply voltage node to the first supply voltage node through a second resistive element.

19. The method of claim 18 further comprising shorting the first and second reference voltage nodes and the first and second supply voltage nodes responsive to detecting coupling of an external device to the plurality of external coupling nodes.

20. The method of claim 17, wherein generating electrical signals across a pair of communications nodes responsive to received electromagnetic signals comprises generating electrical signals across the pair of communications nodes responsive to near field communications signals.

* * * * *